(12) United States Patent
Singh et al.

(10) Patent No.: US 12,049,586 B2
(45) Date of Patent: Jul. 30, 2024

(54) CEMENT COMPOSITIONS AND METHODS

(71) Applicant: Schlumberger Technology Corporation, Sugar Land, TX (US)

(72) Inventors: Dipti Singh, Lake Jackson, TX (US); Robert L. Sammler, Midland, MI (US); Tzu-Chi Kuo, Midland, MI (US); Ron Weeks, Midland, MI (US); Dominic Perroni, Sugar Land, TX (US); Anatoly Medvedev, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/255,376

(22) PCT Filed: Dec. 1, 2021

(86) PCT No.: PCT/US2021/072645
§ 371 (c)(1),
(2) Date: Jun. 1, 2023

(87) PCT Pub. No.: WO2022/120333
PCT Pub. Date: Jun. 9, 2022

(65) Prior Publication Data
US 2024/0026208 A1    Jan. 25, 2024

Related U.S. Application Data

(60) Provisional application No. 63/120,033, filed on Dec. 1, 2020.

(51) Int. Cl.
*C09K 8/467* (2006.01)
*C04B 16/04* (2006.01)
*C04B 103/00* (2006.01)

(52) U.S. Cl.
CPC .............. *C09K 8/467* (2013.01); *C04B 16/04* (2013.01); *C04B 2103/0045* (2013.01)

(58) Field of Classification Search
CPC ....................................................... E21B 33/14
See application file for complete search history.

(56) References Cited

U.S. PATENT DOCUMENTS 6,832,651 B2   12/2004   Ravi et al.
6,902,001 B2   6/2005   Dargaud et al.
(Continued)

FOREIGN PATENT DOCUMENTS

CN      111303845 A      6/2020
WO      2006061561 A1    6/2006
(Continued)

OTHER PUBLICATIONS

International Search Report and Written Opinion issued in International Patent application PCT/US2021/072645 on Mar. 18, 2022, 8 pages.
(Continued)

*Primary Examiner* — Angela M DiTrani Leff
*Assistant Examiner* — Avi T Skaist
(74) *Attorney, Agent, or Firm* — Jeffrey D. Frantz

(57) ABSTRACT

Cement slurries are prepared that comprise water, a hydraulic cement and particles of an oil-absorbent material. The particles are present in an amount sufficient to alter a property of a non-aqueous drilling fluid. The cement slurry is placed in a subterranean well, whereupon the slurry contacts residual drilling fluid on casing and formation surfaces. The oil-absorbent material in the cement slurry may reduce the mobility of the drilling fluid, thereby improving zonal isolation. The oil-absorbent material may be a polyolefin block copolymer.

20 Claims, 4 Drawing Sheets

(56) References Cited

U.S. PATENT DOCUMENTS

| | | |
|---|---|---|
| 7,607,484 B2 | 10/2009 | Roddy et al. |
| 8,551,244 B2 | 10/2013 | Le Roy-Delage et al. |
| 9,222,011 B2 | 12/2015 | Le Roy-Delage et al. |
| 9,701,881 B2 | 7/2017 | Morris et al. |
| 2007/0137528 A1 | 6/2007 | Le Roy-Delage et al. |
| 2014/0284052 A1* | 9/2014 | James .................... E21B 33/14 166/250.14 |
| 2017/0267911 A1* | 9/2017 | Morris .................... B01J 20/26 |
| 2022/0136365 A1 | 5/2022 | Medvedev et al. |

FOREIGN PATENT DOCUMENTS

| | | |
|---|---|---|
| WO | 2013180910 A1 | 12/2013 |
| WO | 2013191776 A1 | 12/2013 |
| WO | 2020009918 A1 | 1/2020 |

OTHER PUBLICATIONS

ASTM D1238-23: "Standard Test Method for Melt Flow Rates of Thermoplastics by Extrusion Plastometer," published by ASTM International, 2023, 19 pages.

Wang et al., "Characterization of Some new Olefinic Block Copolymers," Macromolecules 2007, 40, pp. 2852-2862.

Kolchanov et al., "Effective Zonal Isolation in Horizontal Wells: Mitigating Negative Impact of Mud Channels," SPE-191561-MS, Paper presented at the SPE Annual Technical Conference and Exhibition, Dallas, Texas, USA, Sep. 2018, 12 pages.

ASTM D792-20, "Standard Test Methods for Density and Specific Gravity (Relative Density) of Plastics by Displacement." published by ASTM International, 2020, 6 pages.

Nelson et al., Editors, Well Cementing, Second Edition, 2006, Table of Contents, 22 pages, https://www.slb.com/resource-library/book/well-cementing.

* cited by examiner

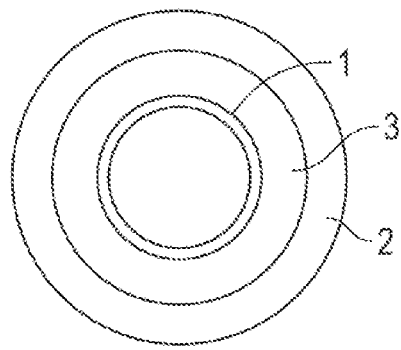
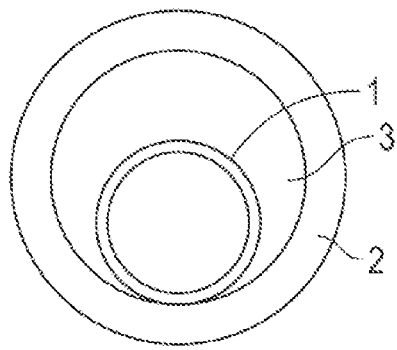
FIG. 1A FIG. 1B
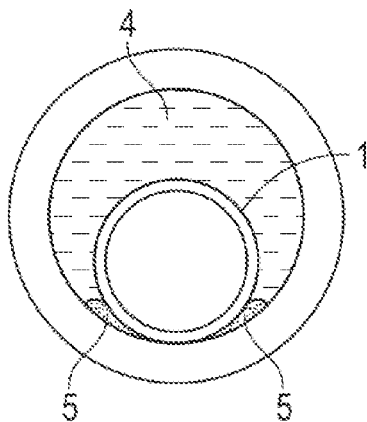
FIG. 2
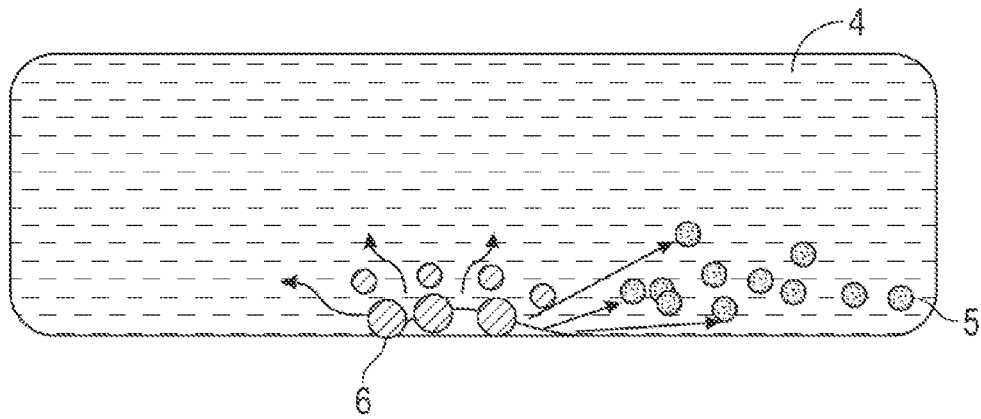
FIG. 3

CEMENT COMPOSITIONS AND METHODS

CROSS REFERENCE PARAGRAPH

This application claims the benefit of U.S. Provisional Application No. 63/120,033, entitled "CEMENT COMPOSITIONS AND METHODS," filed Dec. 1, 2020, the disclosure of which is hereby incorporated herein by reference.

TECHNICAL FIELD

The present disclosure relates generally to cement systems. In particular, the disclosure relates to cement systems that contact drilling fluids within a subterranean well.

BACKGROUND

The statements in this section merely provide background information related to the present disclosure and may not constitute prior art.

During the construction of a subterranean well it is common, during and after drilling, to place a tubular body (e.g., liner or casing) in the well, secured by cement pumped into the annulus around the outside of the liner. The cement supports the tubular body and provides hydraulic isolation of the various fluid-producing zones through which the well passes. This latter function is important because it prevents fluids from different layers contaminating each other. For example, the cement prevents formation fluids from entering the water table and polluting drinking water, or prevents water production instead of oil or gas. A complete discussion of cementing techniques may be found in the following publication. Nelson E B and Guillot D (eds.): *Well Cementing—2nd Edition*, Houston, Schlumberger (2006).

Drilling fluid removal has been a subject of interest in the well-cementing community for many years because of its effect on cement quality and zonal isolation. The principal objective of a primary cement job is to provide complete and permanent isolation of the formations behind the casing. To meet this objective, the drilling mud and the preflushes (if any) should be fully removed from the annulus, and the annular space must be completely filled with cement slurry. Once in place, the cement may harden and develop the necessary mechanical properties to maintain a hydraulic seal throughout the life of the well. Therefore, efficient mud removal and proper slurry placement promote well isolation.

Incomplete removal of drilling fluids within a wellbore may affect the quality of hydraulic cement placement in the wellbore annulus resulting in incomplete zonal isolation. This may occur particularly in horizontal wellbores where poorly centralized casing may increase the likelihood that gelled mud channels may form. Compromised zonal isolation may increase the potential for fluid flow along the casing at applied pressure gradient. Later in the life of the well, such mud channels that have formed may serve as non-productive communication pathways between stages during a stimulation treatment.

The present disclosure provides well cementing systems that may provide additional zonal isolation by facilitating the removal or dispersion of residual drilling fluids, such as non-aqueous drilling fluids, within the wellbore. Further, the cement compositions disclosed herein may interact with residual drilling fluids and alter the properties of such drilling fluids. The present disclosure is particularly directed to drilling fluids, such as non-aqueous drilling fluids which range from diesel- or mineral oil-based fluids to synthetic-based systems. Synthetic-based systems may contain synthetic hydrocarbons, ethers, esters or acetals. The synthetic hydrocarbons may include linear paraffins, linear-α-olefins, poly-α-olefins and internal olefins. The synthetic-based systems may be emulsions in which the hydrocarbon is the external phase.

SUMMARY

In an aspect, embodiments relate to methods for cementing a subterranean well. A cement slurry may be prepared comprising water, a hydraulic cement and particles of an oil-absorbing material comprising polyolefin particles, wherein the polyolefin particles are present in an amount sufficient to interact with a non-aqueous component of a drilling fluid and alter a property of the drilling fluid within the subterranean well. The cement slurry may be placed in the subterranean well, causing the polyolefin particles to contact the non-aqueous drilling fluid component, thereby altering the property of the drilling fluid.

In a further aspect, embodiments relate to methods for establishing zonal isolation in a subterranean well. A cement slurry may be prepared comprising water, a hydraulic cement and particles of an oil-absorbent material comprising polyolefin particles, wherein the polyolefin particles are present in an amount sufficient to interact with a non-aqueous component of a drilling fluid and alter a property of the drilling fluid within the subterranean well. The cement slurry is placed in the subterranean well wherein residual drilling fluid is present along casing and formation surfaces, whereby the polyolefin particles contact the residual drilling fluid, thereby altering the property of the drilling fluid and creating a hydraulic seal in the subterranean well.

BRIEF DESCRIPTION OF THE DRAWINGS

FIG. 1A is a cross-sectional diagram depicting 100% casing centralization in a wellbore, according to the present disclosure.

FIG. 1B is a cross-sectional diagram depicting eccentric casing centralization, which may occur in deviated or horizontal well sections, according to the present disclosure.

FIG. 2 is a cross-sectional diagram depicting a drilling fluid channel arising from poor casing centralization in a wellbore, according to the present disclosure.

FIG. 3 is a diagram depicting a drilling fluid channel that has been deposited in the narrow region of an eccentric annulus and affected by a cement slurry of the present disclosure.

DETAILED DESCRIPTION

Figure 4:
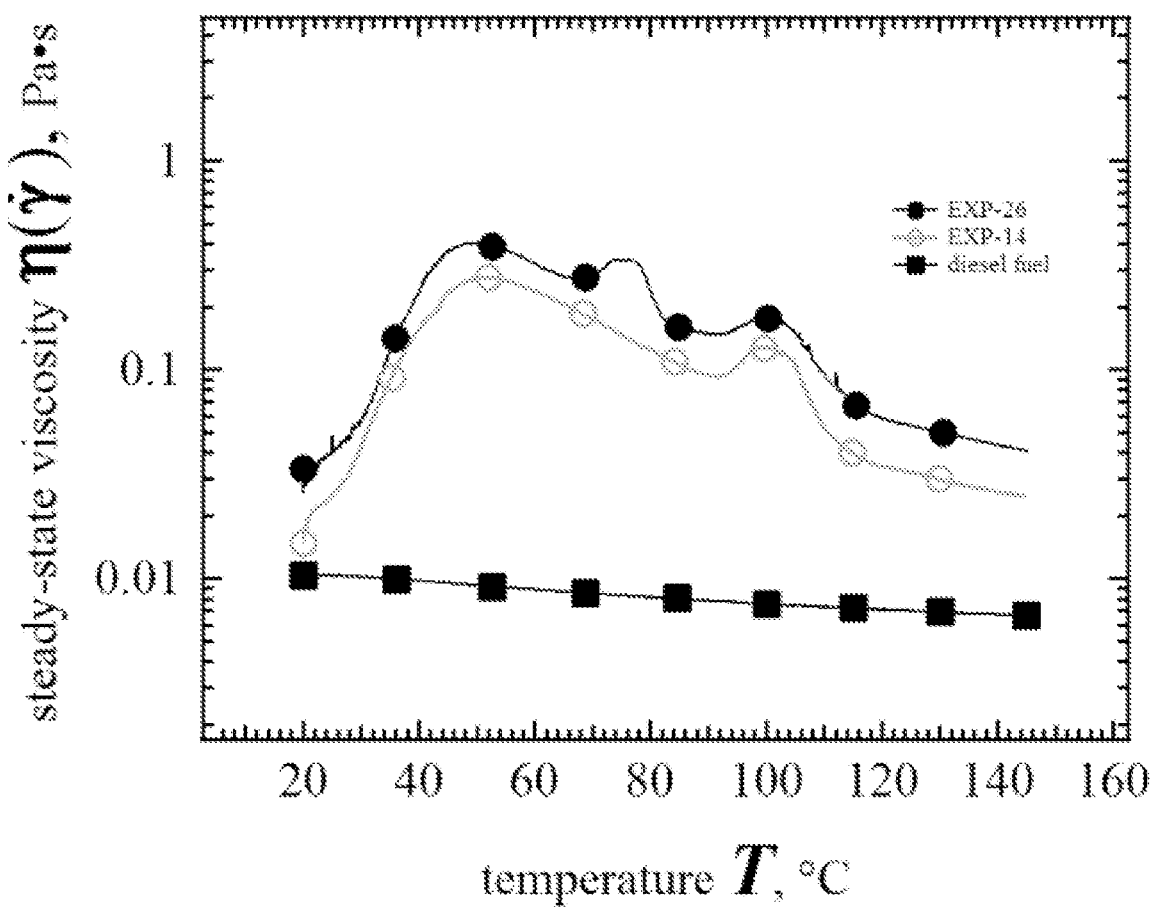
FIG. 4 is a graph depicting the effect of temperature on the viscosification of diesel fuel containing olefin block copolymer particles.

At the outset, it should be noted that in the development of any such actual embodiment, numerous implementations, such as specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific points, it is to be understood that inventors appreciate and understand that any and all data points within the range are to be considered to have been specified, and that inventors possessed knowledge of the entire range and all points within the range.

As discussed earlier, one indication of successful cement placement is complete drilling fluid removal. Complete removal of non-aqueous drilling fluids, for example, may be challenging because such drilling fluids may leave casing and formation surfaces oil wet, which may negatively affect cement sheath bond quality. It is known in the art that such drilling fluids may further contain clays, weighting agents or both.

During most cementing operations, casing 1 is present inside a wellbore having a wall 2. An annulus 3 is therefore present between the casing and the wellbore wall. Optimal drilling-fluid removal may occur when the casing is fully centralized in the wellbore (FIG. 1a). 100% casing centralization maximizes circulation efficiency because there are no narrow regions that may be resistant to fluid flow. However, achieving 100% casing centralization may not be achievable in deviated or horizontal well sections (FIG. 1b). Due to gravity, the casing has a tendency to migrate toward a borehole wall. As a result, during the cement placement process, when cement slurry 4 is pumped to fill the annulus, the eccentric casing position may lead to poor drilling-fluid displacement in the narrow portion of the casing/wellbore annulus, leaving a drilling-fluid channel 5 (FIG. 2).

The present disclosure presents methods for altering drilling-fluid properties as well as achieving zonal isolation. Embodiments may combat drilling fluid channels by interacting with the drilling fluid channels and altering properties of the drilling fluid channels.

In an aspect, embodiments relate to methods for cementing a subterranean well. A cement slurry may be prepared comprising water, a hydraulic cement and particles of an oil-absorbing material comprising polyolefin particles, wherein the polyolefin particles are present in an amount sufficient to interact with a non-aqueous component of a drilling fluid and alter a property of the drilling fluid within the subterranean well. The cement slurry is placed in the subterranean well, causing the polyolefin particles to contact the non-aqueous drilling fluid component, thereby altering the property of the drilling fluid.

In a further aspect, embodiments relate to methods for establishing zonal isolation in a subterranean well. A cement slurry may be prepared comprising water, a hydraulic cement and particles of an oil-absorbent material comprising polyolefin particles, wherein the polyolefin particles are present in an amount sufficient to interact with a non-aqueous component of a drilling fluid and alter a property of the drilling fluid within the subterranean well. The cement slurry is placed in the subterranean well wherein residual drilling fluid is present along casing and formation surfaces, whereby the polyolefin particles contact the residual drilling fluid, thereby altering the property of the drilling fluid and creating a hydraulic seal in the subterranean well.

In an embodiment, a process contributing to achieving zonal isolation may include dynamic removal of the mud channel during cement slurry displacement. The oil-absorbing particles 6 flowing near the drilling fluid channel may physically remove a portion of the drilling fluid 5 and transport the portion away from the drilling fluid channel. Thus, the particles may significantly reduce the size of the drilling fluid channel or even remove it (FIG. 3).

In an embodiment, an oil-absorbing material may be added to the cement slurry. The oil-absorbing material may begin interacting with drilling fluid first at the interface between the drilling fluid and cement. Not being bound to any theory, the oil absorbing material may promote oil diffusion into the set cement material. Once oil from oil-based drilling fluid is absorbed or diffused into the cement, the rheological properties of the drilling fluid may change. Consequently, the drilling fluid may be converted from a fluid-like material to a paste-like structure. Such conversion inside the drilling-fluid channel may prevent fluid flow inside the channel and serve to provide zonal isolation. In addition, oil-absorbing particles in the cement sheath may increase in size, physically blocking small channels or compressing a paste-like mud structure.

The oil-absorbent material may comprise a polyolefin. The polyolefin may comprise polyethylene, polypropylene or combinations thereof. The polyolefin may be a block copolymer. The copolymers may be semi-crystalline, where the major crystalline component may be either ethylene or propylene, and the minor component may be an α-olefin from the group of butene, pentene, hexane, heptane and octene.

Some embodiments may benefit from polyolefins with lower crystallinity levels and higher molecular weights which may be indicated by a lower melt index. The impact of the polyolefin molecular weight on osmotic pressure (and solvent absorption/swelling) may be important in some embodiments. The melt index of the polyolefin may be between 0.5 g/10 min and 10 g/10 min at 190° C. The melt index measurement may be performed according to the method described in ASTM D1238: "Standard Test Method for Melt Flow Rates of Thermoplastics by Extrusion Plastometer," published by ASTM International. The polyolefin may have a melting point between 50° C. and 135° C.

The polyolefin particles may have an initial particle size between about 1 μm and about 850 μm. The polyolefin may have a density between 0.8 g/cm$^3$ and 0.9 g/cm$^3$. The polyolefin particles may be present at a concentration between about 1 vol % and 10 vol %, or between about 2% vol % and 8 vol %, or about 4 vol % to 6 vol %.

Upon contact with the non-aqueous component, the polyolefin may swell and the particle size may increase by 200% to 2000%, or by 400% to 1000%.

In an embodiment, the oil-absorbent particles may be elongated, fibrous, cylindrical or asymmetrical. Such particles with an aspect ratio higher than about 1 may interact and form an interconnected network inside the cement slurry. The elongated shape may also improve the absorbing ability of the particles. The higher aspect ratio increases the probability that the particles will contact each other throughout the cement slurry, allowing more efficient oil absorption and lower absorbent-particle concentrations to achieve a given result. At temperatures lower than the melting point, the polyolefin particles may have an aspect ratio between 1.1 and 2000 before swelling and between 2.2 and 3500 after swelling. The elongated polyolefin particles may also physically interact in the subterranean well to form an interconnected network.

For all embodiments, the cement slurry may have a density between about 10 lbm/gal and about 24 lbm/gal. The cement slurry may comprise portland cement, high alumina cement, fly ash, blast furnace slag, microcement, geopolymers, chemically bonded phosphate ceramics, plaster or resins or combinations thereof.

In addition to the aforementioned particles, the cement slurries may also comprise customary additives such as retarders, accelerators, extenders, fluid-loss-control additives, lost-circulation additives, gas-migration additives, gas-generating additives, expansion additives and antifoam agents. Furthermore, the cement slurries may contain additives that enhance the flexibility and/or toughness of the set cement. Such additives include, but are not limited to, flexible particles having a Young's modulus below about 5000 MPa and a Poisson's ratio above about 0.3. Such particles may have a Young's modulus below about 2000 MPa. Examples include, but are not limited to, non-swellable polypropylene, non-swellable polyethylene, acrylonitrile butadiene, styrene butadiene and polyamide. Such additives may also include non-swellable fibers selected from the list comprising polyamide, polyethylene and polyvinyl alcohol. Metallic microribbons may also be included.

Furthermore, the temperature at which the disclosed fluids operate may be between and 400° F., or between 100° F. and 375° F.

For all embodiments, the concentration of oil-absorbent particles may vary in the cement sheath. This may be accomplished by varying the rate at which the oil-absorbent particles are added to the cement slurry during mixing and pumping. Certain portions of the cement sheath may not contain oil-absorbent particles. As long as there are regions along the cement sheath providing zonal isolation, the well as a whole may have a hydraulic seal. For example, sections containing the oil-absorbent particles may be located above and below producing zones. Under these circumstances, the concentration of the oil-absorbent particles may vary between 0% and 40% by weight of cement. This approach may be more economical than scenarios where the oil-absorbent particles are present throughout the cement sheath.

EXAMPLES

The following examples illustrate the performance of the polyolefin block copolymers compared to control systems containing no swellable material, or containing ground rubber particles (GR). The polyolefin particles were obtained from The Dow Chemical Company, Midland, MI. Physical properties of the proprietary polyolefins are given in Table 1. EXP-150 is a mixture of polyolefin block copolymers.

TABLE 1

Physical properties of proprietary polyolefins from The Dow Chemical Company.

| Sample Designation | Density (g/cm$^3$) | Crystallinity (%)[1] | Melt index (g/10 min, 2.16 Kg @230° C.) | Melting point (° C.) | Particle Size (μm) ($d_{50}$) |
|---|---|---|---|---|---|
| EXP-14 | 0.868 | 16 | 8 | 51 | 250 |
| EXP-18 | 0.866 | 7 | 0.5 | 119 | 410 |
| EXP-26 | 0.863 | 14 | 25 | 55 | 325 |
| EXP-80 | 0.86 | 13 | <0.5 | 37 | 677 |
| EXP-I50 | 1.004 | — | — | — | 412 |

Density was measured by employing method ASTM D792, "Standard Test Methods for Density and Specific Gravity (Relative Density) of Plastics by Displacement." Crystallinity was determined by differential scanning calorimetry (DSC), as described in the following reference: Wang H P et al.: "Characterization of Some new Olefinic Block Copolymers," Macromolecules 2007, 40, 2852-2862. The melt indices were determined according to method ASTM D1238, "Standard Test Method for Melt Flow Rates of Thermoplastics by Extrusion Plastometer." Melting points were determined by DSC, measured at a rate of 10° C./min. Particle sizes ($d_{50}$) were measured by a laser diffraction particle size analyzer.

Example 1— Drilling Fluid Viscosification

Particles of EXP 14 and EXP 26 were added to diesel fuel at a concentration of 10 wt %. The mixtures were placed in a stress controlled rotational rheometer (Model AR-G2, manufactured by TA Instruments, New Castle, DE) and heated to temperatures up to about 150° C. Viscosity measurements were measured at a shear rate of 1000 s$^{-1}$. The results, shown in FIG. 4, indicated that viscosification of the diesel fuel reached a maximum at about 50° C.

Figure 5:
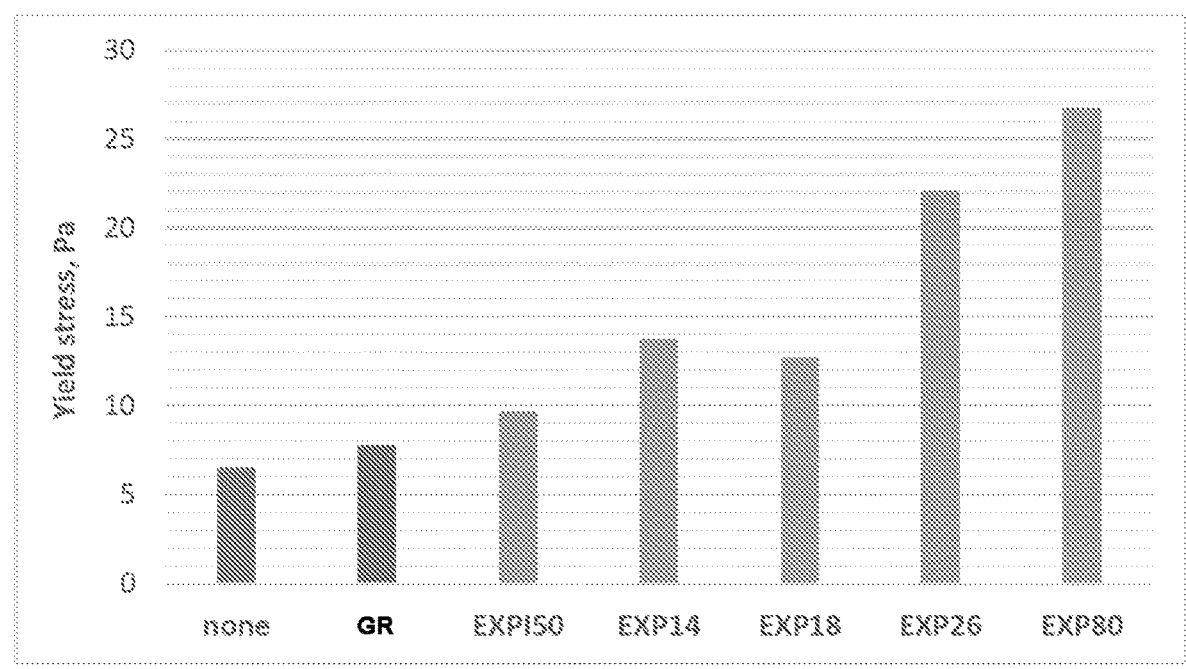
FIG. 5 is a graph depicting the viscosification of an oil-base drilling fluid containing olefin block copolymer particles.

In another set of experiments, polyolefin block copolymer particles were immersed in an oil-base drilling fluid—Megadril™, available from MI Swaco. The particles were added to the drilling fluid at a concentration of 0.013 g/mL. Yield stress measurements were performed at 20° C. with a TA-SHR3 rheometer, manufactured by TA Instruments. The results, shown in FIG. 5, indicated that significant increases in fluid yield stress occurred when the polyolefin block copolymers were present. Ground rubber particles (GR) were also tested, and the resulting yield stress was lower than that observed with the polyolefin block polymers.

Example 2—Resistance to Pressure

Applicant developed a laboratory method to investigate the ability of cement slurries containing swellable materials to reduce fluid flow in a drilling-fluid filled channel. Two 600-mL cement slurries were prepared in a Waring blender. The cement was Class H portland cement. The density of both slurries was 14.5 lbm/gal (1740 kg/m 3). Both slurries were extended with fly ash.

A comparative slurry composition is given in Table 2.

TABLE 2

Comparative cement slurry composition.

| Additive | Concentration |
|---|---|
| Fly ash | 50% BVOB* |
| AMPS/Acrylamide copolymer | 0.3% BWOB** |
| Sodium Polynaphthalene Sulfonate | 0.3% BWOB |
| Polysaccharide Biopolymer | 0.3% BWOB |
| Silica Fume | 8.0% BWOB |
| Sodium Lignosulfonate | 0.3% BWOB |
| Polypropylene Glycol | 0.050 gal/sk*** |
| Water | 5.91 gal/sk |

*by volume of blend;
**by weight of blend;
***gallons per 94-lbm sack of cement

A slurry composition according to the disclosure is given in Table 3.

TABLE 3

Cement slurry composition according to the disclosure.

| Additive | Concentration |
|---|---|
| Fly ash | 50% BVOB |
| AMPS/Acrylamide copolymer | 0.3% BWOB |
| Sodium Polynaphthalene Sulfonate | 0.1% BWOB |
| Polysaccharide Biopolymer | 0.3% BWOB |
| Polypropylene Glycol | 0.050 gal/sk |
| Sodium Lignosulfonate | 0.3% BWOB |
| Silica Fume | 8.0% BWOB |
| Polyolefin Block Copolymer | 5.0% BWOC |
| Water | 5.60 gal/sk |

A 3-in. long by 1-in. wide steel pipe was capped on one end and filled with slurry and then capped on the other end. Small vent holes were added to the caps to equalize the pressure during high pressure curing. The pipes containing slurry were loaded into a curing chamber and were exposed to 170° F. (77° C.) and 3000 psi (21 MPa). After the slurry had set, a hole was drilled in the cement leaving a channel of 3-mm, 5-mm or 10-mm diameter. The bottom of the hole was plugged, the channel was filled with 13-lbm/gal (1620-kg/m$^3$) MegaDril™ drilling fluid, and was allowed to set for 6 days at atmospheric conditions. The permeability of the resulting mud channel was probed by the flow of water through the channel. The flow rate was set at 1 mL/min and resulting pressure were measured using a Teledyne ISCO D-series syringe pump.

Figure 6:
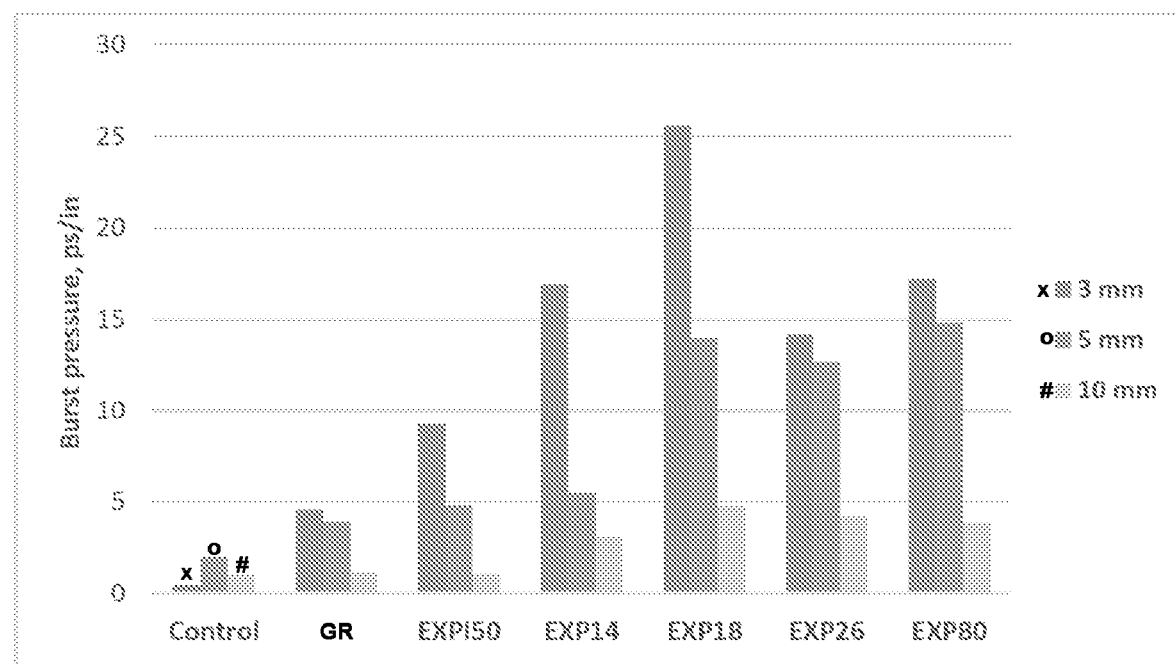
FIG. 6 depicts the resistance to flow of mud channels exposed to cements containing olefin block copolymer particles.

The results, presented in FIG. 6, show that the mud channels exposed to cements containing polyolefin block copolymers were more pressure resistant compared to the comparative cement of the cement containing ground rubber (GR). In order to scale the laboratory results to a real application, it could be calculated that 5 psi in a 3-in. tube corresponds to 3000 psi at a 50-ft distance.

Example 3—Absorbent Particle Swelling

The swelling of polyolefin block copolymers in diesel fuel was assessed. The density of the diesel fuel was 0.84 g/mL. Swelling was measured by a Phase and Interface Characterization Apparatus (PICA), which employs an optical technique to determine phase and solubility. Some embodiments may benefit from assessing particle size when density and viscosity of the fluid is known. Swelling was also measured gravimetrically. The procedure, developed by The Dow Chemical Company, consists of several steps.

1. Weigh vials ($W_0$).
2. Place 0.2 g of particles into the vials and weigh ($W_1$).
3. Record PICA images.
4. Add 4 mL of diesel fuel into the vials and seal the vials with a cap.
5. After a 24-hr exposure, record a second set of PICA images.
6. Weigh the vials ($W_2$).
7. Decant the diesel fuel and weigh the vials again ($W_3$).

$$\% \text{ swelling} = \frac{(W_3 - W_1)}{(W_1 - W_0)} \times 100$$

The experiments were conducted at room temperature. The results are given in Table 4.

TABLE 4

Swelling measurements of polyolefin block copolymer particles suspended in diesel fuel.

| Sample Designation | PICA Swelling (%) | Gravimetric Swelling (%)[1] |
|---|---|---|
| EXP-14 | 972 | 265 |
| EXP-18 | 520 | 278 |
| EXP-26 | 1649 | 809 |
| EXP-80 | 855 | 800 |
| EXP_I50 | 480 | 200 |
| GR | 260 | — |

The preceding description has been presented with reference to present embodiments. Persons skilled in the art and technology to which this disclosure pertains will appreciate that alterations and changes in the described structures and methods of operation can be practiced without meaningfully departing from the principle, and scope of this present disclosure. Accordingly, the foregoing description should not be read as pertaining only to the precise structures described and shown in the accompanying drawings, but rather should be read as consistent with and as support for the following claims, which are to have their fullest and fairest scope.

The invention claimed is:

1. A method, comprising:
   preparing a cement slurry comprising water, a hydraulic cement and particles of an oil-absorbent material comprising polyolefin particles, wherein the polyolefin particles are present at a concentration between about 1 vol % and about 10 vol %;
   placing the cement slurry in a subterranean well; and
   causing the polyolefin particles to contact a non-aqueous drilling fluid component, thereby altering a property of a drilling fluid, and
   wherein the polyolefin particles swell upon contact with the non-aqueous drilling fluid component, and a particle size of the polyolefin particles increases by about 200% to about 1000% upon contact with the non-aqueous drilling fluid component.

2. The method of claim 1, wherein the oil-absorbent material comprises polyethylene or polypropylene, or a combination thereof, and wherein a melt index of the polyolefin is between 0.5 g/10 min and 10 g/10 min at 190° C.

3. The method of claim 1, wherein the polyolefin particles have an initial particle size between about 1 mm and about 850 mm.

4. The method of claim 1, wherein the polyolefin has a melting point between 50° C. and 135° C.

5. The method of claim 4, wherein, at temperatures lower than the melting point, the polyolefin particles are elongated, having an aspect ratio between 1.1 and 2000 before swelling and between 2.2 and 3500 after swelling.

6. The method of claim 5, wherein the elongated polyolefin particles physically interact in the subterranean well to form an interconnected network.

7. The method of claim 1, wherein the polyolefin has a density between 0.8 g/cm$^3$ and 0.9 g/cm$^3$.

8. The method of claim 1, wherein a property of the non-aqueous drilling fluid component is flowability, and wherein the polyolefin particles decrease the flowability of the non-aqueous drilling fluid component.

9. The method of claim 1, wherein the cement slurry has a density between about 10 lbm/gal and about 24 lbm/gal.

10. The method of claim 1, wherein a concentration of the polyolefin particles varies in the cement slurry, between about 0.001% by weight of cement (BWOC) and 40% BWOC, thereby creating a cement sheath in the subterranean well with a variable polyolefin concentration.

11. A method, comprising:
preparing a cement slurry comprising water, a hydraulic cement, and particles of an oil-absorbent material comprising polyolefin particles, wherein the polyolefin particles are present at a concentration between about 1 vol % and about 10 vol %; and
placing the cement slurry in a subterranean well wherein residual drilling fluid is present along casing and formation surfaces, whereby the polyolefin particles contact the residual drilling fluid, thereby altering a property of a drilling fluid and creating a hydraulic seal in the subterranean well,
wherein the polyolefin particles swell upon contact with the residual drilling fluid, and a size of the polyolefin particles increases by about 200% to about 800% upon contact with a non-aqueous drilling fluid component.

12. The method of claim 11, wherein the oil-absorbent material comprises polyethylene or polypropylene, or a combination thereof, and wherein a melt index of the polyolefin is between 0.5 g/10 min and 10 g/10 min at 190° C.

13. The method of claim 11, wherein the oil-absorbent material particles have an initial particle size between about 1 mm and about 850 mm.

14. The method of claim 11, wherein the polyolefin particles have a melting point between 50° ° C. and 135° C.

15. The method of claim 14, wherein, at temperatures lower than the melting point, the oil-absorbent material particles are elongated, having an aspect ratio between 1.1 and 2000 before swelling and between 2.2 and 3500 after swelling.

16. The method of claim 15, wherein the elongated polyolefin particles interact in the subterranean well to form an interconnected network.

17. The method of claim 11, wherein the polyolefin has a density between 0.8 g/cm$^3$ and 0.9 g/cm$^3$.

18. The method of claim 11, wherein a property of the non-aqueous component of the drilling fluid is flowability, and wherein the polyolefin particles decrease the flowability of the drilling fluid.

19. The method of claim 11, wherein the cement slurry has a density between about 10 lbm/gal and about 24 lbm/gal.

20. The method of claim 11, wherein a concentration of the polyolefin particles varies in the cement slurry, between about 0.001% by weight of cement (BWOC) and 40% BWOC, thereby creating a cement sheath in the subterranean well with a variable polyolefin concentration.

* * * * *